US012576963B2

(12) United States Patent　　(10) Patent No.:　　US 12,576,963 B2
Picard et al.　　(45) Date of Patent:　　Mar. 17, 2026

(54) PEDAL CARTRIDGE

(71) Applicant: Ratier-Figeac SAS, Figeac Cedex (FR)

(72) Inventors: Pierre-Alex Picard, Figeac (FR);
Pierre-Jacques Labry, Faycelles (FR)

(73) Assignee: RATIER-FIGEAC SAS, Figeac Cedex
(FR)

( * ) Notice: Subject to any disclaimer, the term of this
patent is extended or adjusted under 35
U.S.C. 154(b) by 118 days.

(21) Appl. No.: 18/493,332

(22) Filed: Oct. 24, 2023

(65) Prior Publication Data

US 2024/0140591 A1　　May 2, 2024

(30) Foreign Application Priority Data

Oct. 31, 2022　　(EP) ..................................... 22306648

(51) Int. Cl.
*B64C 13/04*　　(2006.01)
*G05G 1/30*　　(2008.04)
*G05G 1/36*　　(2008.04)
*G05G 1/38*　　(2008.04)
*G05G 1/44*　　(2008.04)

(52) U.S. Cl.
CPC ............. *B64C 13/044* (2018.01); *G05G 1/36*
(2013.01); *G05G 1/38* (2013.01); *G05G 1/44*
(2013.01)

(58) Field of Classification Search
CPC ........ B64C 13/044; B64C 13/06; G05G 1/36;
G05G 1/38; G05G 1/44
See application file for complete search history.

(56) References Cited

U.S. PATENT DOCUMENTS

| | | | | | |
|---|---|---|---|---|---|
| 2,424,523 | A | * | 7/1947 | Watter | .................... B64C 25/44 |
| | | | | | 74/484 R |
| 10,377,468 | B2 | * | 8/2019 | Carner | .................... B64C 13/12 |
| 11,155,337 | B2 | | 10/2021 | Guering et al. | |
| 11,157,034 | B2 | * | 10/2021 | Petro-Roy | ................ G05G 1/44 |
| 11,225,322 | B2 | * | 1/2022 | Labry | .................. B64C 13/044 |
| 11,396,362 | B2 | * | 7/2022 | Voiles | .................... B64C 13/10 |
| 12,258,119 | B2 | * | 3/2025 | Picard | .................... B64C 13/14 |
| 2017/0174324 | A1 | | 6/2017 | Carner et al. | |

(Continued)

FOREIGN PATENT DOCUMENTS

| | | | | |
|---|---|---|---|---|
| BR | 102019006577 B1 | * | 5/2024 | .............. B60T 11/18 |
| CN | 202189480 U | | 4/2012 | |
| DE | 10148281 A1 | | 1/2003 | |

(Continued)

OTHER PUBLICATIONS

Abstract for CN202189480 (U), Published: Apr. 11, 2012, 1 page.

(Continued)

*Primary Examiner* — Adam D Rogers
(74) *Attorney, Agent, or Firm* — CANTOR COLBURN
LLP

(57)　　ABSTRACT

A pedal cartridge for an aircraft. The pedal cartridge is
connectable to a pedal mechanism and includes: a pedal. The
pedal includes a pedal axle receiving portion configured to
receive a pedal axle of the pedal mechanism such that the
pedal is rotatably connectable to the pedal axle. The mecha-
nism also includes a first rotation sensor component, the first
rotation sensor component configured to interact with a
second rotation sensor component of the pedal mechanism
to permit rotation of the pedal about the pedal axle to be
detected.

12 Claims, 12 Drawing Sheets

(56)                    References Cited

U.S. PATENT DOCUMENTS

| 2021/0129975 | A1  |     | 5/2021 | Voiles et al. |            |
|--------------|-----|-----|--------|---------------|------------|
| 2024/0143014 | A1  | *   | 5/2024 | Picard ...................... | G05G 1/40 |

FOREIGN PATENT DOCUMENTS

| FR | 3031083    | A1 | * | 7/2016 | ............. | B64C 13/06 |
|----|------------|----|---|--------|--------------|------------|
| JP | 2001235306 | A  | * | 8/2001 |              |            |
| WO | 2014106428 | A1 |   | 7/2014 |              |            |

OTHER PUBLICATIONS

Abstract for DE10148281 (A1), Published: Jan. 23, 2003, 1 page.
European Search Report for Application No. 22306648.1, mailed
Mar. 27, 2023, 8 pages.

* cited by examiner

PEDAL CARTRIDGE

CROSS REFERENCE TO RELATED APPLICATIONS

This application claims priority to European Patent Application No. 22306648.1 filed Oct. 31, 2022, the entire contents of which is incorporated herein by reference.

TECHNICAL FIELD

This disclosure relates to a pedal cartridge for a pedal mechanism for an aircraft and a pedal mechanism for an aircraft.

BACKGROUND

Pedal mechanisms in aircraft permit braking and rudder control of the aircraft. These pedal mechanisms may be located below the floor, making it difficult to carry out maintenance. In other arrangements, the pedal mechanisms can be suspended from the cockpit board above the floor, but this requires reinforcing of the cockpit board due to the weight of the pedal units. Stature adjustment mechanisms are required to adjust a pedal's neutral position due to pilots being of different stature. Such mechanisms are often complex and occupy a large amount of cabin space.

SUMMARY

According to a first aspect, there is provided pedal cartridge for an aircraft, the pedal cartridge connectable to a pedal mechanism, the pedal cartridge comprising of a pedal, the pedal comprising a pedal axle receiving portion configured to receive a pedal axle of the pedal mechanism such that the pedal is rotatably connectable to the pedal axle; and a first rotation sensor component, the first rotation sensor component configured to interact with a second rotation sensor component of the pedal mechanism to permit rotation of the pedal.

In a conventional pedal arrangement if the rotational path jams during a braking action, an undesired rudder action may occur. Likewise, if the rotational path jams during a rudder action, an undesired braking action may occur. By providing a pedal arrangement as described, the braking action and rudder action may be provided with different rotational paths. As such an undesired rudder action during a braking action or an undesired braking action during a rudder action may be prevented, thereby allowing safe operation of the aircraft.

The rotation of the pedal about the pedal axle may be from a rotational neutral position.

The first rotation sensor component may be configured to, in response to detection of the rotation, permit a signal to be sent to the aircraft.

The first rotation sensor component may be located at the pedal axle receiving portion.

The first rotation sensor component may be a braking sensor component configured to permit a braking signal to be sent to the aircraft upon detection of the rotation.

The pedal cartridge may comprise a rotational feeling device configured to bias the pedal to a rotational neutral position.

The rotational feeling device may be located at the pedal axle receiving portion.

The rotational feeling device may comprise an elastic element, wherein a first end of the elastic element is connectable to the pedal axle and a second end of the elastic element is connected to the pedal cartridge, the elastic element configured to surround the pedal axle. The elastic element may be a coiled spring.

The pedal cartridge may comprise a housing configured to enclose the pedal axle.

The housing and the pedal may be configured to together maintain the pedal cartridge on the pedal axle.

The first rotation sensor component may comprise a cap rotationally coupled to the pedal cartridge, wherein the cap rotates on rotation of the pedal.

According to a second aspect there is provided a pedal mechanism comprising: the pedal axle; the second rotation sensor component; and a pedal cartridge as described above. the pedal axle received in the pedal axle receiving portion.

The pedal mechanism may comprise a pedal arm connected to the pedal axle, the pedal arm rotatable about a pedal arm rotation point, wherein the pedal axle is fixed to the pedal arm such that rotation of the pedal arm causes rotation of the pedal axle to vary the rotational neutral position.

The pedal may be positioned vertically below the pedal arm rotation point in use.

The pedal arm may be rotatable about the pedal arm rotation point on translation of the pedal (e.g. from a translational neutral position), the pedal mechanism further comprising: a stature adjustment mechanism, the stature adjustment mechanism actuatable, during a stature adjustment process, to move the pedal arm rotation point (e.g. to adjust the translational neutral position).

By moving the pedal arm rotation point in this way, a significant adjustment in translation neutral position may be made for a compact pedal mechanism, permitting pilots of differing stature to be accommodated.

The stature adjustment mechanism may be configured to constrain the pedal arm rotation point to follow a first path during the stature adjustment process. The first path may be a circular arc.

The stature adjustment mechanism may comprise a stature adjustment arm, the stature adjustment arm rotatably connected to the pedal arm at the pedal arm rotation point, the stature adjustment arm rotatably connected to a fixed point on the aircraft. The stature adjustment mechanism may be actuatable to move the pedal arm rotation point by rotating the stature adjustment arm about the fixed point.

The fixed point may be positioned below the pedal arm rotation point. The fixed point may be on an aircraft floor. The pedal connection point may be below the pedal arm rotation point.

The pedal arm may comprise a pedal arm fixing point. Movement of the pedal arm fixing point may be constrained during the stature adjustment process causing rotation of the pedal arm around the pedal arm fixing point. By rotating the pedal arm in this way, a more significant adjustment in translation neutral position may be made for a compact pedal mechanism, permitting pilots of different stature to be accommodated.

The pedal arm fixing point may be constrained to follow a second path during the stature adjustment process. The pedal arm fixing point may be above the pedal arm rotation point. The pedal arm fixing point may be above the pedal connection point. The second path may be a circular arc. The first path may intersect the second path.

The pedal arm may comprise a pedal arm connection point. The pedal arm rotation point may be between the pedal arm connection point and the pedal arm fixing point.

The pedal arm rotation point may be closer to the pedal arm fixing point than to the pedal arm connection point. By having the pedal arm rotation point closer to the pedal arm fixing point, displacement of the pedal arm connection point may be increased during the stature adjustment process in response to pedal arm rotation, providing a more significant adjustment in translation neutral position for a compact pedal mechanism, permitting pilots of differing stature to be accommodated.

The pedal mechanism may comprise a rod, the rod rotatably connected to the pedal arm at the pedal arm fixing point, the rod rotatably connected to a rod connector at a rod connector point.

The rod connector may be substantially fixed during the stature adjustment process.

The pedal mechanism may comprise a translation sensor configured to detect translation of the pedal (e.g. from the translational neutral position), the translation sensor configured to output a translation signal in response to detecting the translation of the pedal. The rod connector may be comprised in the translation sensor, the translation sensor configured to measure movement of the rod at the rod connector point to detect translation of the pedal.

The pedal arm may be connectable to an additional pedal via the pedal arm fixing point such that movement of the pedal of the pedal mechanism causes opposing movement of a pedal of the additional pedal.

The pedal arm fixing point may be connectable to the additional pedal via the translation sensor.

The translation sensor may comprise a shaft and a crank connected to the shaft. The rod connector may be comprised in the crank such that movement of the rod causes rotation of the shaft. The translation sensor may be configured to measure rotation of the shaft to detect the translation of the pedal.

The crank may comprise an additional rod connector connectable to the additional pedal via an additional rod.

The pedal connection point may comprise a pedal axle, the pedal axle fixed to the pedal arm such that rotation of the pedal arm causes rotation of the pedal axle. This may permit a rotational neutral position of the pedal to vary during translation of the pedal (e.g. during the aircraft movement control process and/or the stature adjustment process). This may provide improved ergonomics for the pilot and may reduce the requirement for further components to vary rotational neutral position of the pedal.

The pedal arm rotation point may be fixed during an aircraft movement control process.

The pedal mechanism may comprise a pedal cartridge, the pedal cartridge comprising: a pedal rotationally connected to the pedal arm at the pedal connection point; and a first rotation sensor component configured to interact with a second rotation sensor component of the pedal mechanism to permit rotation of the pedal to be detected.

The pedal mechanism may comprise a second pedal arm connectable to a second pedal at a second pedal connection point, the second pedal arm rotatable about a second pedal arm rotation point on translation of the second pedal, the stature adjustment mechanism actuatable, during the stature adjustment process, to move the second pedal arm rotation point (e.g. to adjust a translational neutral position of the second pedal). The translational neutral position of the second pedal may be aligned with the translational neutral position of the first pedal. The stature adjustment arm may be rotatably connected to the second pedal arm rotation point.

The pedal rotation point and the second pedal rotation may be coaxial. The pedal rotation point and the second pedal rotation may be aligned with each other. The pedal rotation point and the second pedal rotation may be fixed relative to each other. The pedal rotation point and the second pedal rotation may follow the same trajectory upon actuation of the stature adjustment mechanism.

The stature adjustment mechanism may comprise an electrical actuator for actuating the stature adjustment mechanism.

According to a fourth aspect, there is provided a rudder and brake pedal unit comprising: a pedal mechanism as described above; and a second pedal mechanism as described above, the first and second pedal mechanisms being coupled to each other.

According to a fifth aspect, there is provided a pedal mechanism for an aircraft, the pedal mechanism comprising of a pedal arm connectable to a pedal at a pedal connection point, the pedal arm rotatable about a pedal arm rotation point on translation of the pedal; a pedal axle fixed to the pedal arm at the pedal connection point such that rotation of the pedal arm causes rotation of the pedal axle, the pedal axle receivable in a pedal axle receiving portion of a pedal cartridge; and a first rotation sensor component, the first rotation sensor component configured to interact with a second rotation sensor component of the pedal mechanism to permit rotation of the pedal about the pedal axle to be detected.

Any of the components of the first to fifth aspects may comprise any of the features described with respect to the other aspects.

BRIEF DESCRIPTION OF THE FIGURES

Embodiments will be further described and explained by way of example with reference to the accompanying drawings in which.

DETAILED DESCRIPTION

Figure 1:
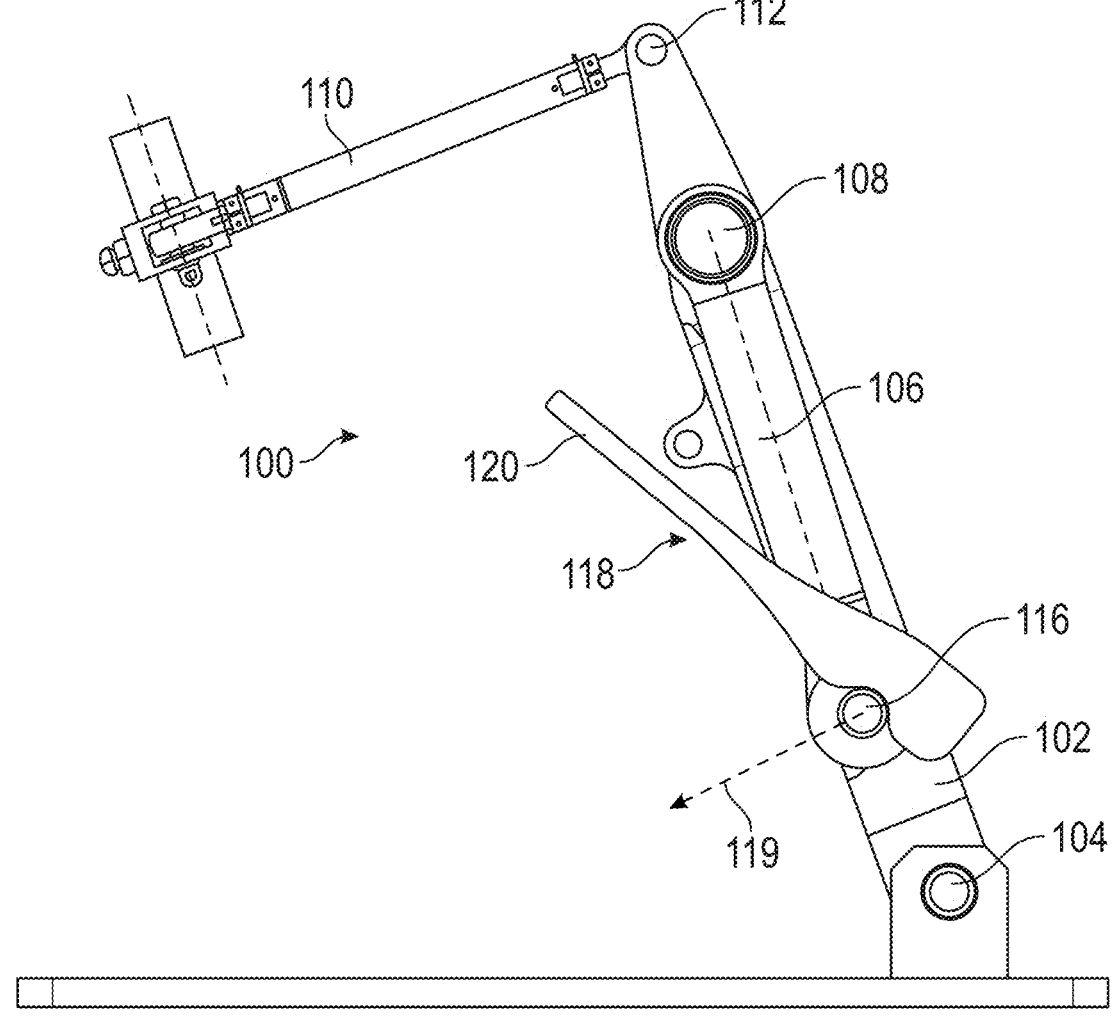
FIG. 1 shows a schematic of a pedal mechanism.
Figure 2:
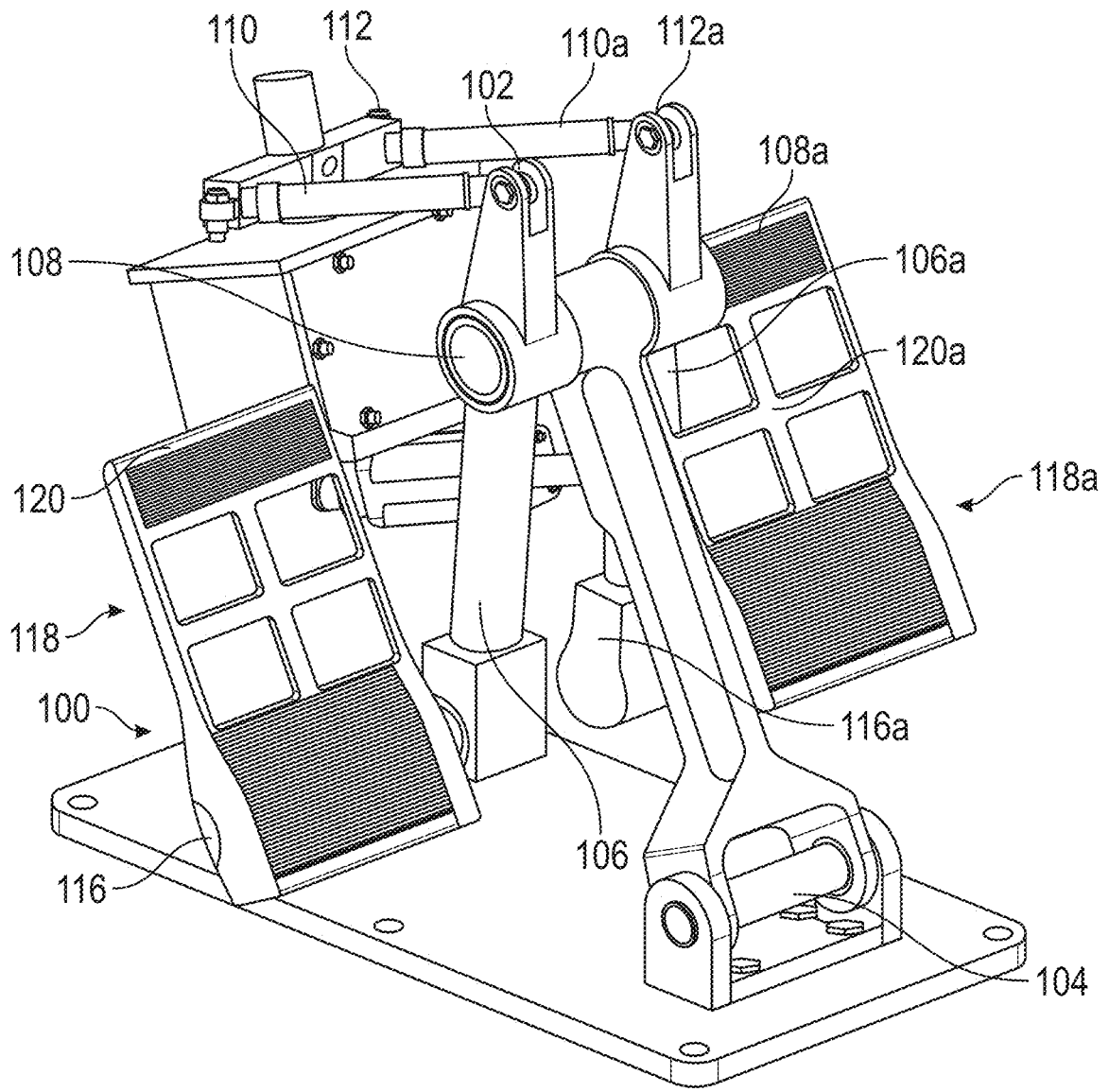
FIG. 2 shows a perspective view of the pedal mechanism.
Figure 3:
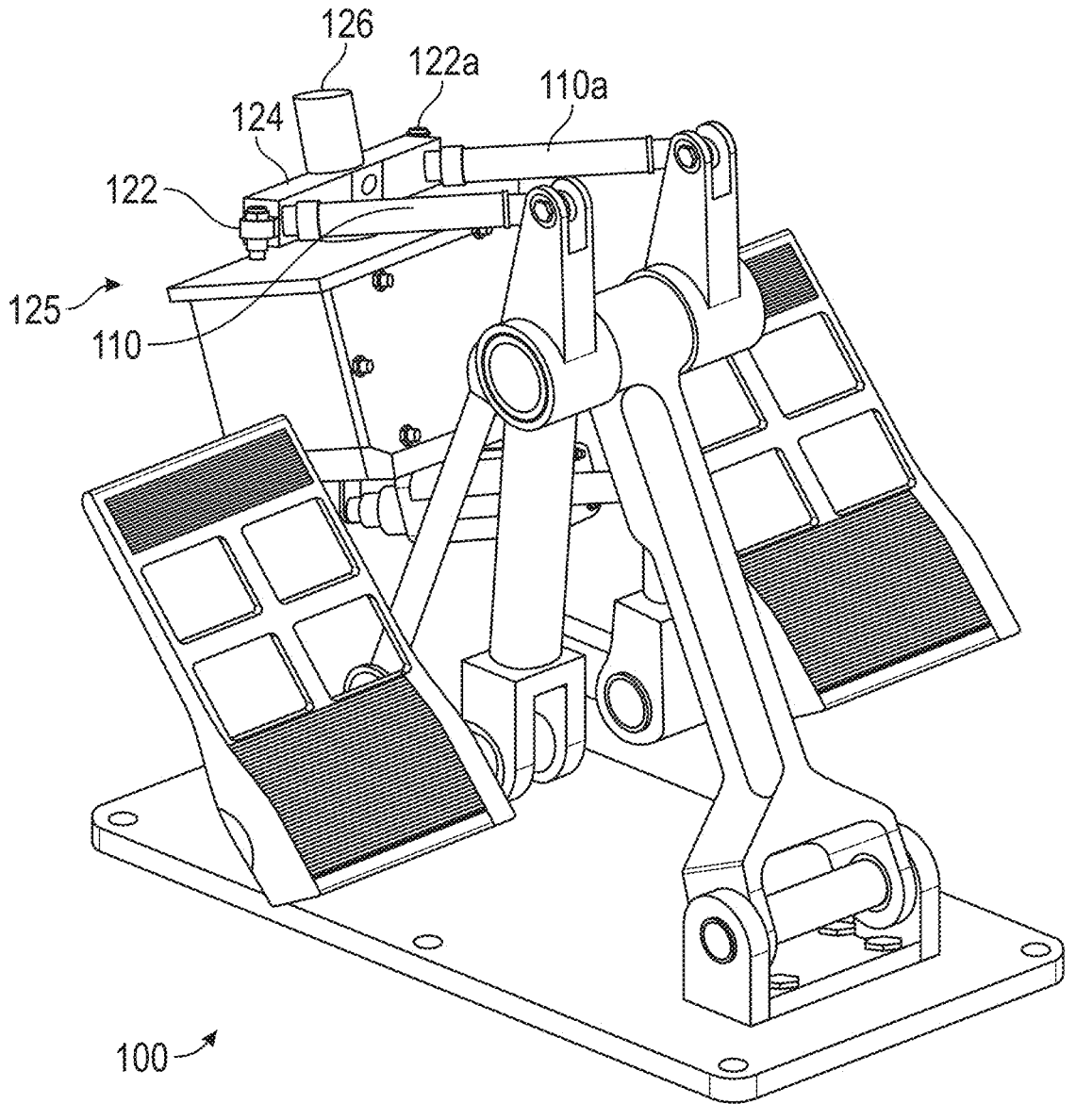
FIG. 3 shows a perspective view of the pedal mechanism.

With reference to FIGS. 1 to 3, the pedal mechanism 100 comprises a stature adjustment mechanism comprising a stature adjustment arm 102. The pedal mechanism 100 comprises a pedal arm 106 and a rod 110.

The stature adjustment arm 102, pedal arm 106, and rod 110 each comprise a rigid body having a first end and a second, opposite end. The first end of the stature adjustment arm 102 is rotatably connected to a fixed point 104, which in the present example is on a floor of the aircraft, forming a floor rotation point 104. The second end of the stature adjustment arm 102 is rotatably connected to the pedal arm 106 at a pedal arm rotation point 108. The pedal arm rotation point 108 is between the first and second ends of the pedal arm 106. The pedal arm rotation point 108 is positioned above (i.e. further from the aircraft floor) the fixed point 104 in use.

The first end of the pedal arm 106 is rotatably connected to the second end of the rod 110 at pedal arm fixing point 112. The second end of the pedal arm 106 is connected to a pedal cartridge 118 at pedal connection point 116. A pedal 120 of the pedal cartridge 118 is rotatably connected to the pedal arm 106 at pedal connection point 116. In particular, as described in more detail below with respect to FIG. 7, the pedal 120 is rotatably connected to a pedal axle 204 which is fixed to the pedal arm 106 at pedal connection point 116. Pedal arm fixing point 112 is positioned above the fixed point 104 and the pedal arm rotation point 108 in use.

With reference to FIG. 3, from which some reference numerals are omitted for clarity, the pedal mechanism 100 comprises a translation sensor 125. The translation sensor comprises a rod connector 124. The rod connector 124 is a crank 124. The rod 110 is rotatably connected to the rod connector 124 at a rod connector point 122, which is on the first end of the rod 110. The rod connector 124 permits rotation of the rod 110 about the rod connector point 122 about two axes normal to the rod 110. The translation sensor 125 further comprises a translational feeling device (not shown), which provides feedback to the pilot in response to turning of the shaft 126.

In other embodiments, a different type of translation sensor may be employed. For example, in these embodiments, the translation sensor may comprise a rotational sensor (e.g. detecting rotation of the pedal arm directly) or an optical sensor. Additionally, the translation sensor may be positioned at any location where the translation sensor can detect translation of the pedal.

In use, during an aircraft movement control process (e.g. during taxi) a pilot provides a translation input to the pedal 120 along the direction 119 indicated in FIG. 1 from a translation neutral position. During the aircraft movement control process, the stature adjustment arm does not rotate about the fixed point 104. In this example, and as explained in more detail below, the translation input to the pedal 120 is along a circular arc. It should be understood that during this translation, some rotation of the pedal may occur (e.g. due to variation in rotational neutral point of the pedal or due to a braking input, as explained below), and the motion need not be a pure translation without rotation of the pedal.

The translation input to the pedal 118 causes the pedal arm 106 to rotate about the pedal arm rotation point 108. This in turn causes movement of the pedal arm fixing point 112, in the opposite direction to the movement of the pedal 120, due to the pedal 120 and the pedal arm fixing point 112 being on opposite sides of the pedal arm rotation point 108. The rod 110 therefore translates (also in the opposite direction to the pedal 120), causing rotation of the crank 124 and the shaft 126. The translation sensor 125 detects the rotation of the shaft 126 to detect the translation of the pedal from the translation neutral position, and in response, outputs a translation signal (e.g. a rudder signal, so that the pedal mechanism 100 may be used to steer the aircraft left (or right) on a yaw axis of the aircraft). During this process, the translational feeling device provides a force in response to the translational movement, biasing the pedal back to its translational neutral position. In the translational neutral position, the translation sensor does not output the translation signal.

As best shown in FIG. 2, the pedal mechanism 100 comprises an additional pedal 120a, which is positioned on the opposite side of the pedal mechanism 100, such that the pilot operates the pedal 120 with a left foot and the additional pedal 120a with a right foot. The additional pedal 120a has, in correspondence to the pedal 120, an additional pedal arm 106a, an additional pedal arm rotation point 108a, an additional rod 110a, an additional pedal arm fixing point 112a, an additional pedal connection point 116a and an additional pedal cartridge 118a. These components operate in the same manner as those related to the pedal 120, and repeated description of the additional components is omitted.

The additional pedal arm 106a is connected to the stature adjustment arm 102 at the additional pedal arm rotation point 108a i.e. a single stature adjustment mechanism and stature adjustment arm 102 is shared between the pedal 120 and the additional pedal 120a. The additional pedal arm rotation point 108a is on the opposite side of the stature adjustment arm 102 from the pedal arm rotation point 108. The pedal mechanism 100 is substantially symmetrical about the stature adjustment arm 102.

The additional rod 110a is rotatably connected to the rod connector 124 at additional rod connector point 122a. Additional rod connector point 122a is on an opposite side of the shaft 126 to the rod connector point 122. This means that during translational movement of the pedal 120, rotation of the rod connector 124 about the shaft 126 causes an opposing movement of the additional pedal 120a, in the opposite direction to the pedal 120.

Figure 4:
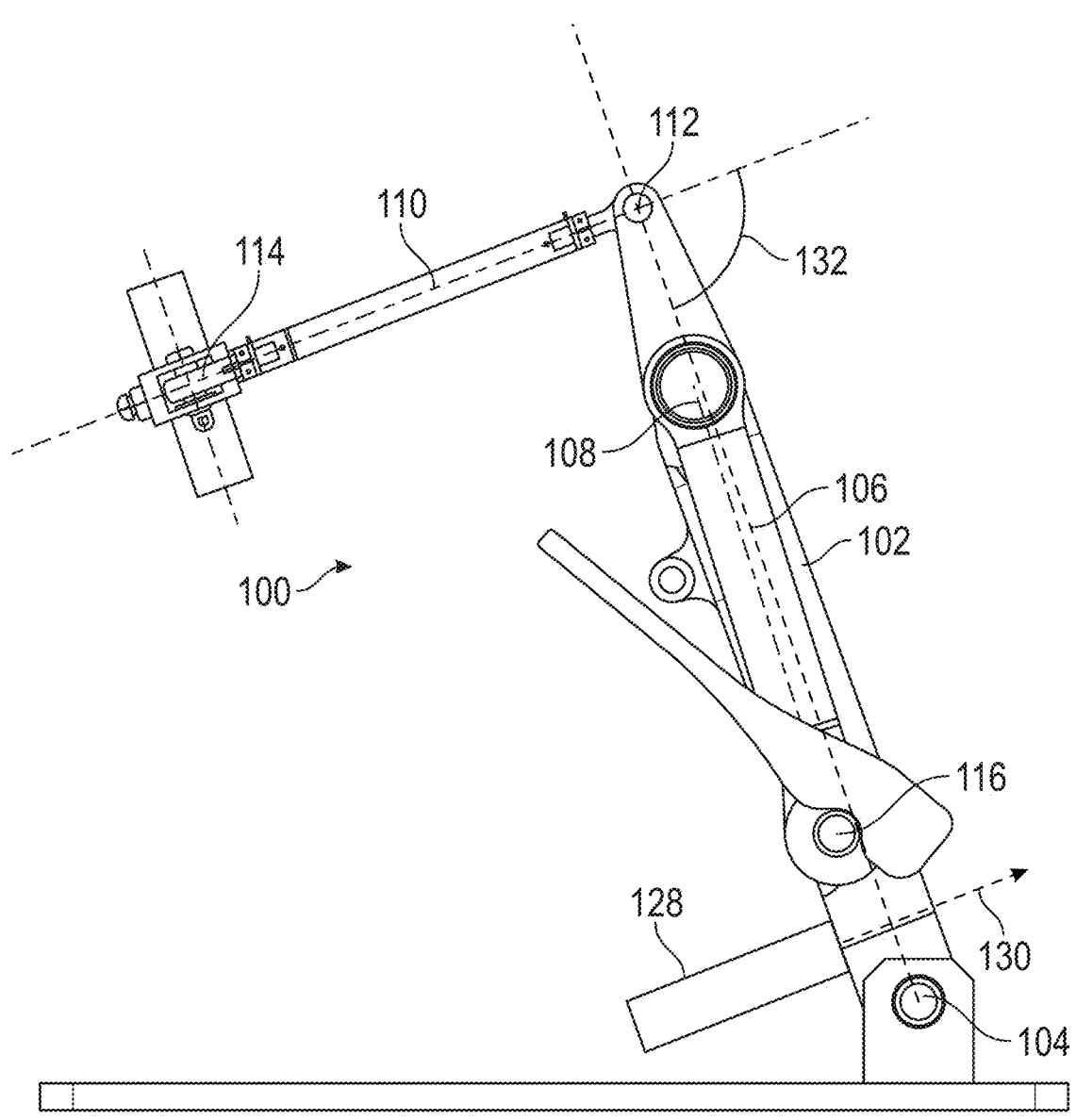
FIG. 4 shows a perspective side view of the pedal mechanism during a stature adjustment process.

Referring to FIG. 4, there is shown a schematic drawing of the pedal mechanism 100 during a stature adjustment process. The stature adjustment process is performed by actuating the stature adjustment mechanism, which in the present example comprises the stature adjustment arm 102 and an actuator 128. Because the pedal arm 106 and the additional pedal arm 106a are connected to the stature adjustment mechanism in the same manner, during the stature adjustment process the pedal 120 and the additional pedal 120a experience the same translational movement, and rotation of the rod connector 124 cannot occur. This means that the rod connector 124 may be considered a fixed point 114 (as shown in FIG. 4), with the rods 110 110a rotatably connected to the fixed point 114. The stature adjustment arm 102, the pedal arm 106 and the rod 110 therefore form a substantially planar, 3-bar linkage mechanism during the stature adjustment process.

The actuator 128 is an electro mechanical actuator, in particular a solenoid in the present example. The actuator 128 is configured to apply a force 130 to rotate the stature adjustment arm 102 about the fixed point 104.

The stature adjustment process is performed when the aircraft is stationary. The stature adjustment process permits the pilot to adjust the translational neutral position of the pedal 120, permitting pilots of different stature to be accommodated in the aircraft.

During the stature adjustment process, the actuator 128 actuates the stature adjust mechanism. In particular, the actuator 128 applies a force 130 to the stature adjustment arm 102, which causes the stature adjustment arm 102 to rotate about the fixed point 104. This causes the pedal arm rotation point 108 to move, resulting in movement of the pedal arm 106. This in turn causes movement of the translation neutral position of the pedal arm connection point 116 and the pedal 120.

The pedal arm rotation point 108 is constrained by the stature adjustment arm 102 such that the pedal arm rotation point 108 follows a first path during the stature adjustment process. The first path is a circular arc having radius of curvature equal to a length of the stature adjustment arm 102.

Other ways of constraining the pedal arm rotation point 108 to follow a first path during the stature adjustment process may be foreseen.

The pedal arm 106 being fixed to the rod 110 at the pedal arm fixing point 112, and the rod 112 being fixed to the fixed point 114 constrains the pedal arm fixing point 112 to a second path. The second path is also a circular arc having radius of curvature equal to a length of the rod 110.

The rod 110 significantly constrains movement of the pedal arm fixing point 112 in the direction in which the pedal arm rotation point 108 moves on actuation of the actuator 128. In the present example this is due to the rod 110 being angled relative to the stature adjustment arm 102 (e.g. at an angle of greater than 30 degrees, more specifically greater than 45 degrees, more specifically greater than 60 degrees, more specifically substantially 75 degrees).

Constraining the movement of the pedal arm fixing point 112 in this way causes rotation of the pedal arm 106 about the pedal arm rotation point 108 on movement of the pedal arm rotation point 108. Because the pedal arm fixing point 112 is on an opposite side of the pedal arm rotation point 108 to the pedal arm connection point 116, the rotation causes the pedal arm connection point 116 to move further in the same direction as that caused by movement of the pedal arm rotation point 108, which in the present example is in the direction of the force 130. This results in further movement of the translational neutral position than if the movement of the pedal arm fixing point 112 were not constrained.

Additionally, because the pedal arm rotation point 108 is closer to the pedal arm fixing point 112 than the pedal arm connection point 116 (in the present example the distance between the pedal arm connection point 116 and the pedal arm rotation point 108 is more than double that between the pedal arm fixing point 112 and the pedal arm rotation point 108, more specifically substantially three times that between the pedal arm fixing point 112 and the pedal arm rotation point 108), the pedal arm 108 rotates more significantly for a given movement of the pedal arm rotation point 108. This results in further movement of the pedal arm connection point 116 (in the direction of the force 130) than if the pedal arm rotation point 108 were not closer to the pedal arm fixing point 112 than the pedal arm connection point 116.

Each of the above-described features means that during the stature adjustment process the pedal arm connection point 116 and the pedal 120 follow a circular arc with a radius much larger than the length of any of the individual rods. This means that a more stature adjustment may be achieved by a mechanism which takes up significantly less space (for example, than a single large rod achieving the same radius of curvature).

Figure 5A:
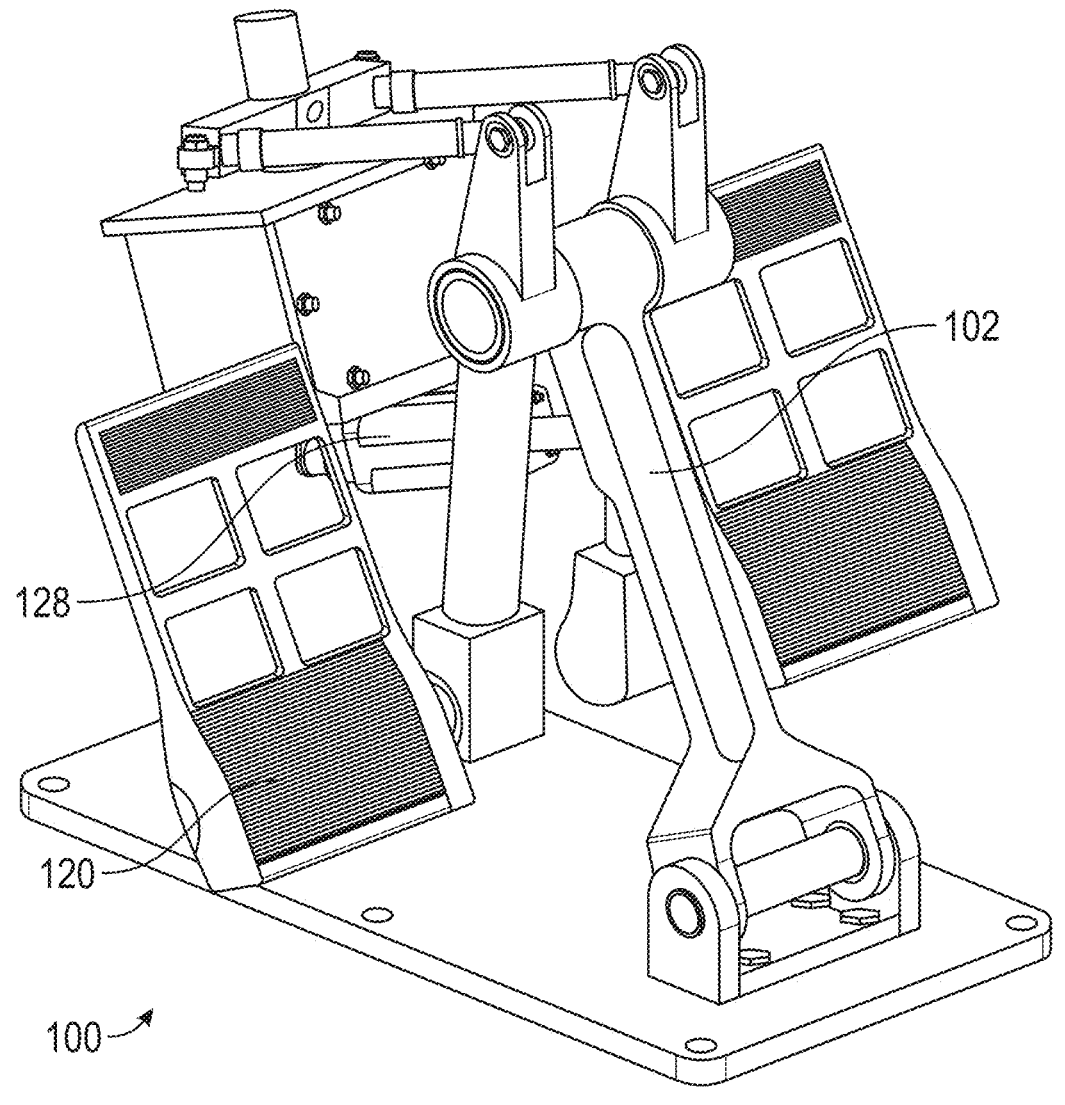
FIG. 5*a-c* show cross-sectional perspective views of a pedal unit.
Figure 5B:
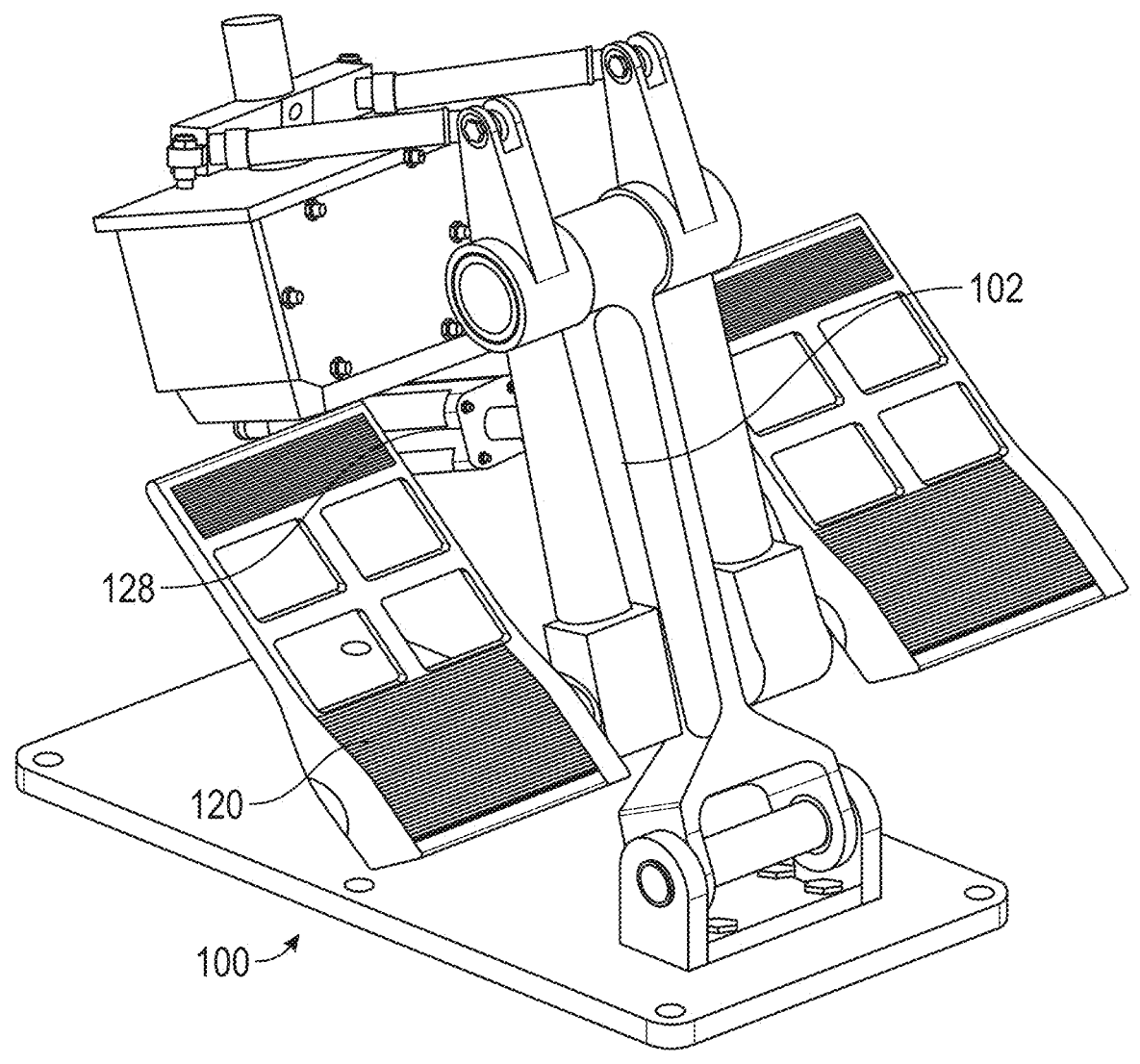
Figure 5C:
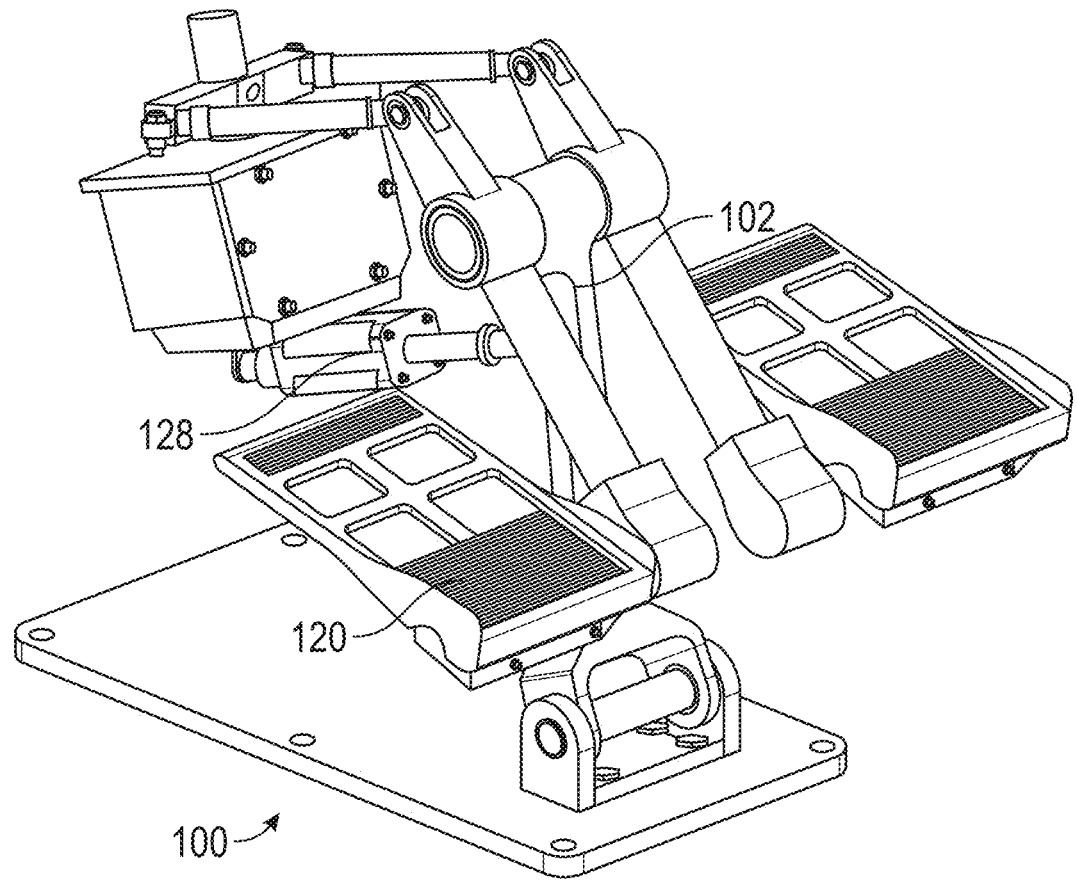

This is illustrated by FIG. 5a-c (from which reference numerals are omitted for clarity), which show the pedal mechanism 100 in three different stature positions. FIG. 5a shows the pedal mechanism 100 with the pedal 120 having a translational neutral position for a large pilot. FIG. 5b shows the pedal mechanism 100 with the pedal 120 having a translational neutral position for a medium-sized pilot. FIG. 5c shows the pedal mechanism 100 with the pedal 120 having a translational neutral position for a short pilot. As can be seen, there is moderate movement of the stature adjustment arm 102 from FIG. 5a to FIG. 5b and from FIG.

5b to FIG. 5c. However, this moderate movement results in significant movement of the pedal's translation neutral position, as explained above.

Figure 6:
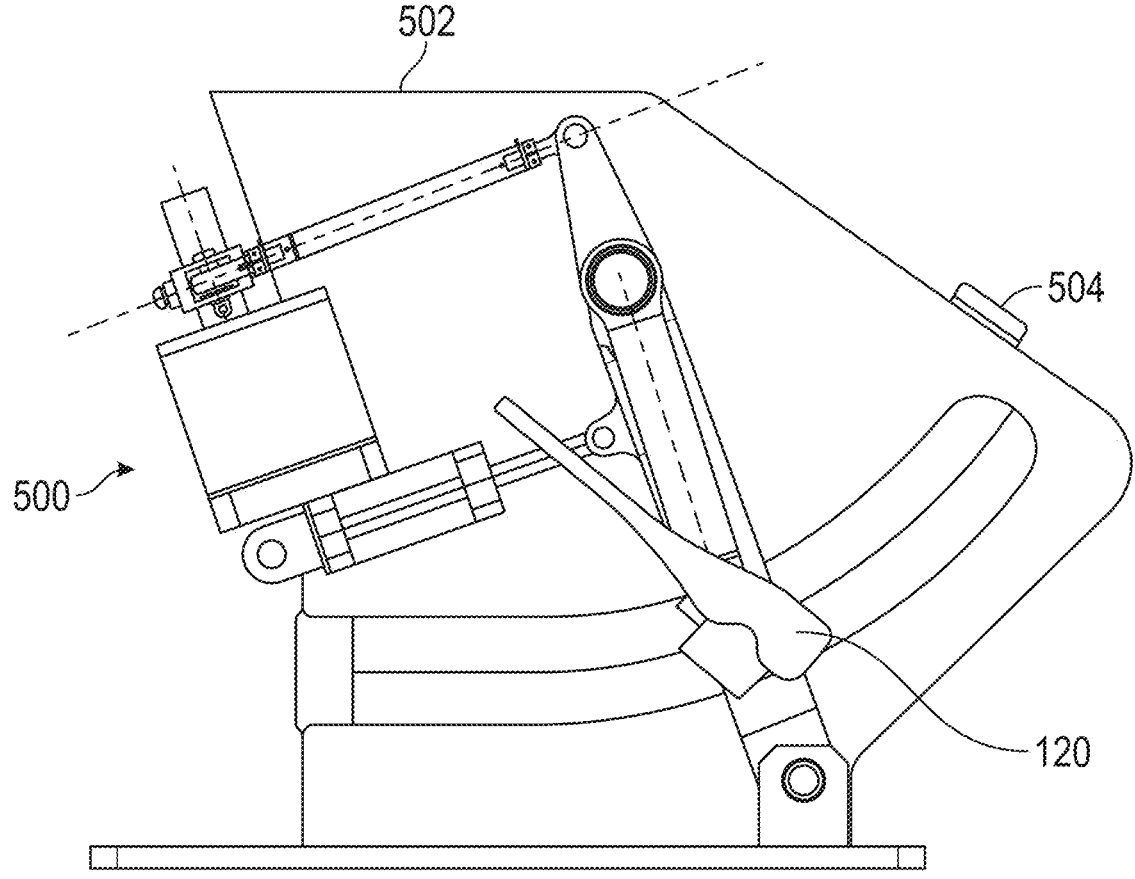
FIG. 6 shows a perspective view of the pedal unit.

With reference to FIG. 6, a pedal unit 500 comprises the pedal mechanism 100, a housing 502 and a user interface 504. The housing 502 partially encloses the pedal assembly in a manner that allows a user to access the pedals 120. The actuator 128 is actuated by an input command from the user interface 504.

Figure 7:
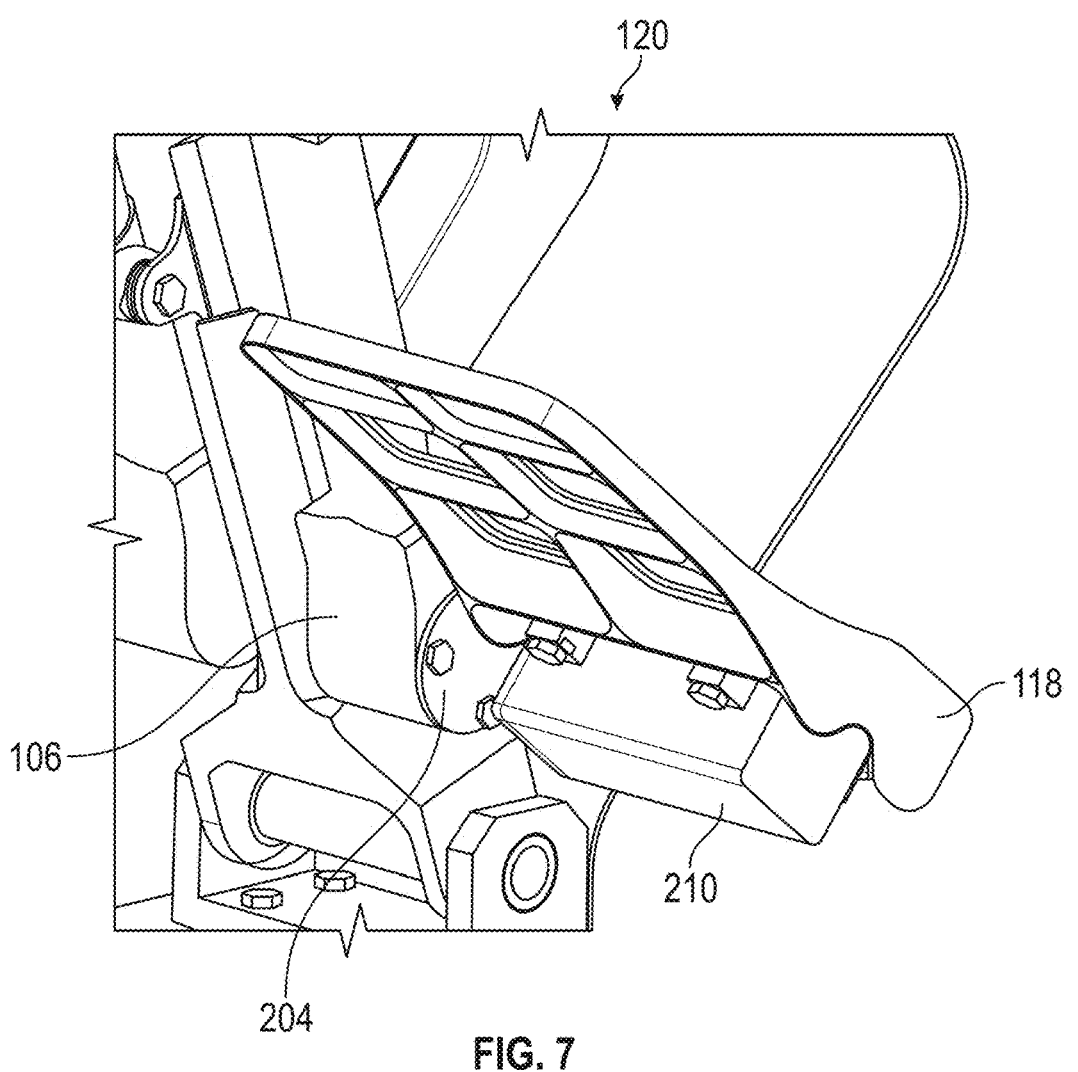
FIG. 7 shows an enlarged perspective view of a pedal cartridge.

FIG. 7 shows an enlarged view of the pedal cartridge 120, which, as mentioned above, comprises the pedal 118. The pedal cartridge 120 comprises a housing 210. The pedal 118 and the housing 210 are provided as separate components, such that the pedal is detachable from the housing 210 by disconnecting the pedal 118 from the housing 210.

The pedal mechanism 100 comprises a pedal axle 204. The pedal axle 204 is fixed to the pedal arm 106 at the pedal arm connection point 116. The pedal axle 204 is rigidly fixed to the pedal arm 106, such that relative rotation between the pedal axle 204 and the pedal arm 106 is not permitted.

The pedal 118 is rotatable about the pedal axle 204. For example, the pedal 118 can move from a rotational neutral position to a plurality of rotated states about the pedal axle 204. As described below, this movement provides a braking action. However, other braking actions may be foreseen.

The pedal 118 and the housing 210 are on opposing sides of the pedal axle 204, with the pedal axle 204 extending between the pedal 118 and the housing 210. The pedal 118 and the housing 210 together hold the pedal cartridge 120 on the pedal axle 204. The pedal axle 204 extends through the pedal 118 and the housing 210. The pedal axle 204 comprises a flange (i.e. a portion at its end of increased width) which acts to maintain the pedal cartridge 120 on the pedal axle 205.

Figure 8:
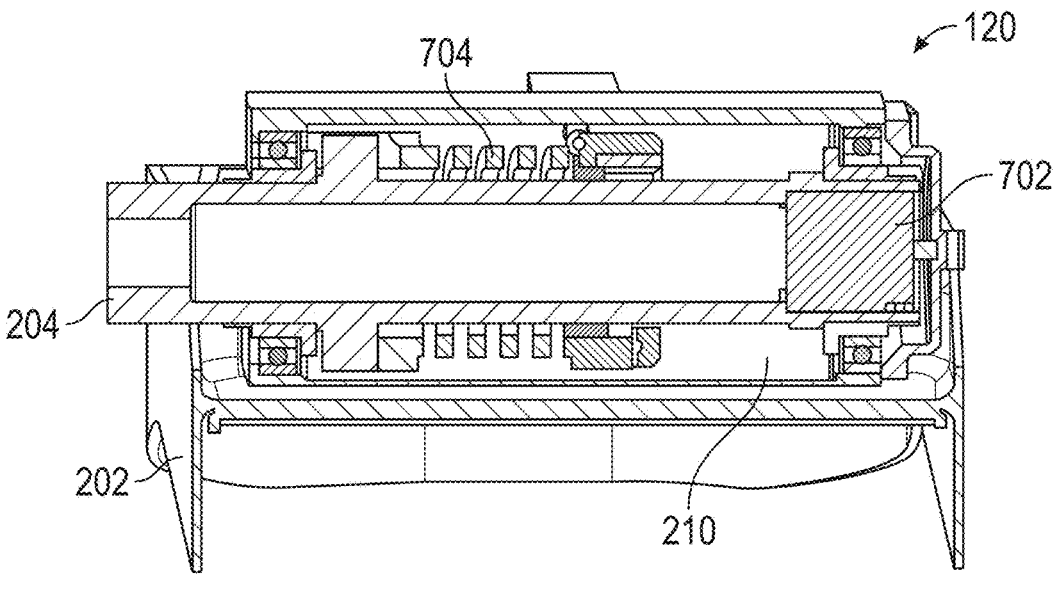
FIG. 8 shows a cross-sectional view of the pedal cartridge.
Figure 9:
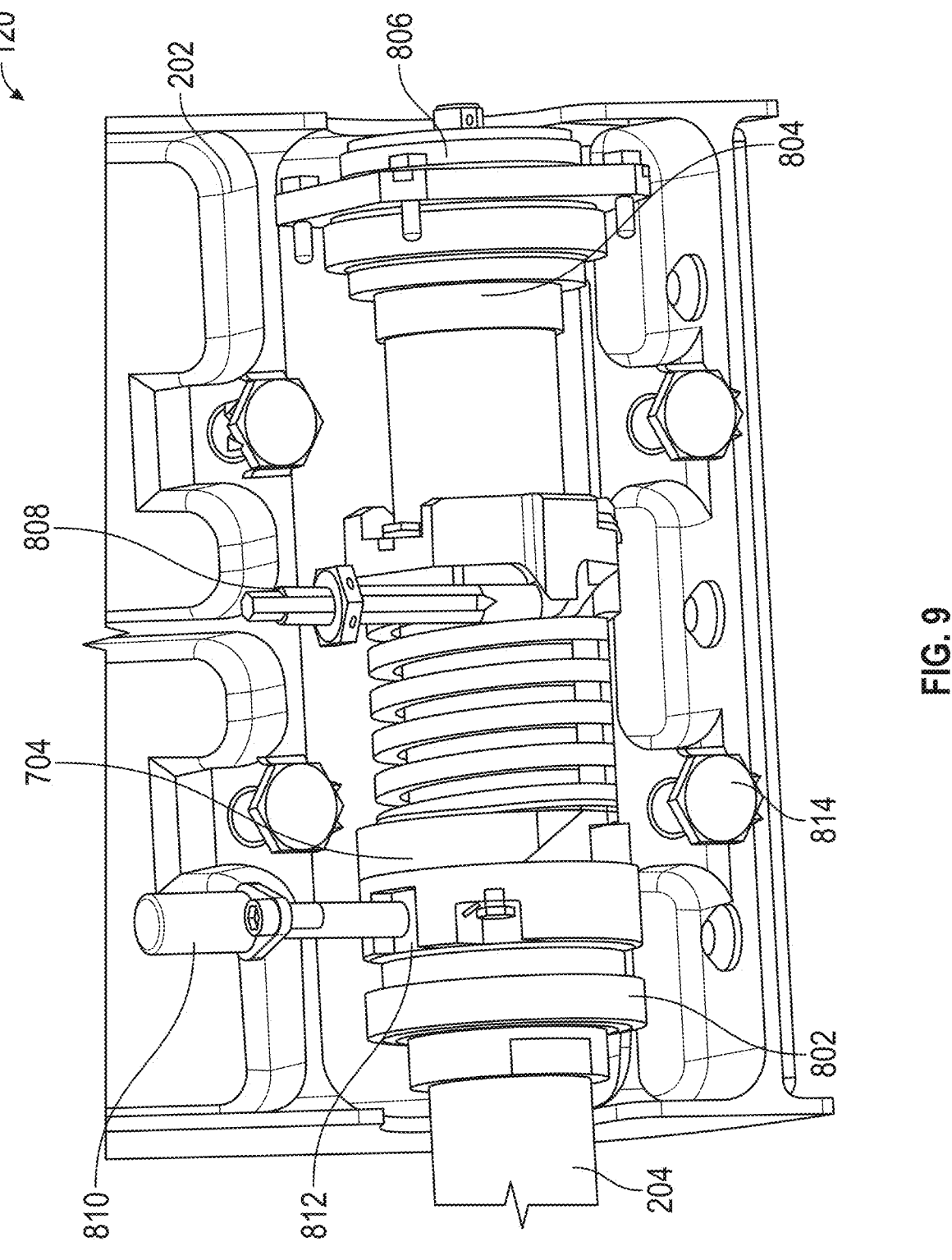
FIG. 9 shows a perspective view of the pedal cartridge with the housing omitted.
Figure 10:
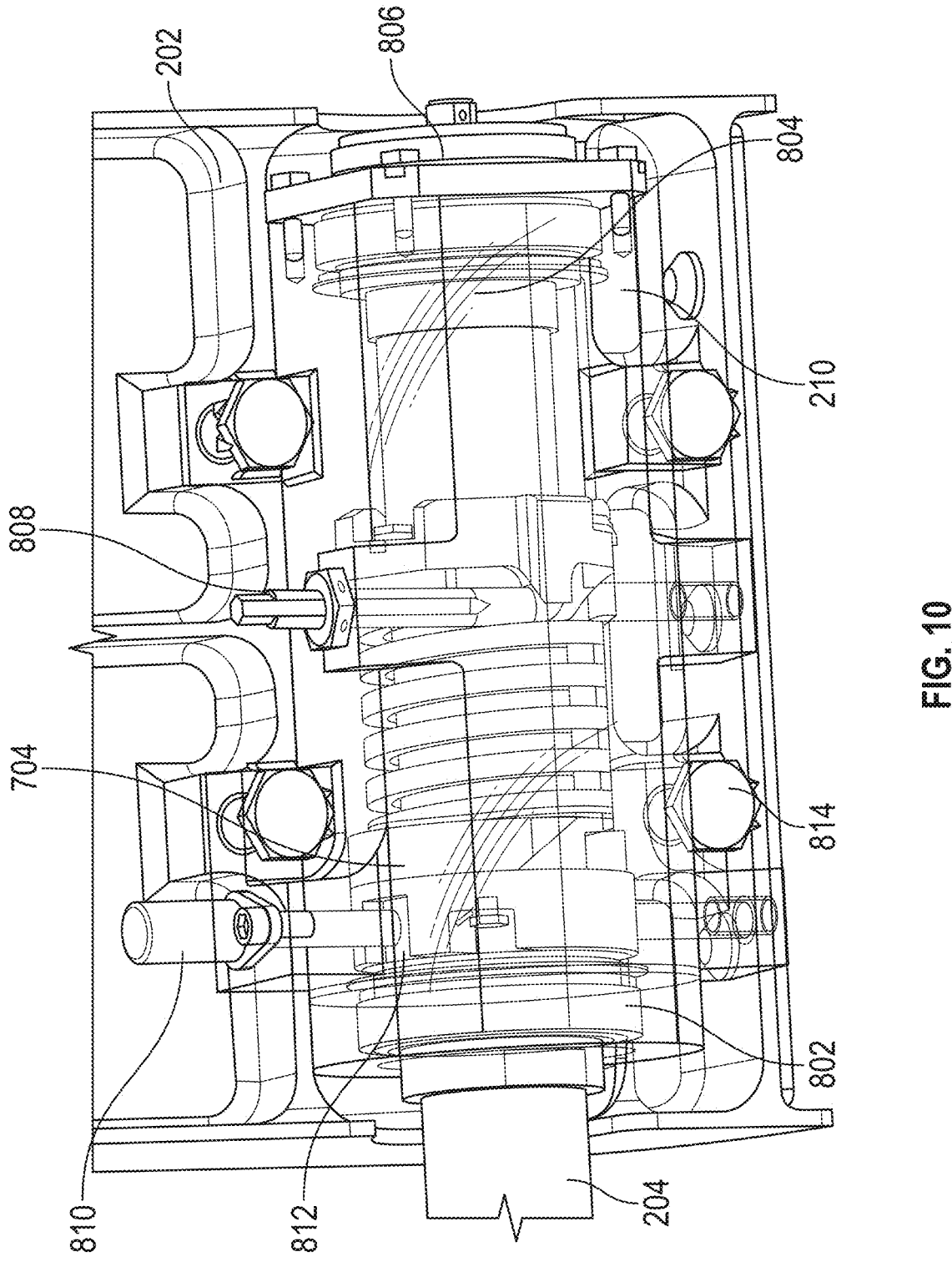
FIG. 10 shows a perspective view of the pedal cartridge with the housing shown translucently.

With reference to FIG. 8 and FIG. 9, the pedal mechanism comprises a rotation sensor 702 located partly in the pedal axle 204 and partly in the pedal cartridge 120, and configured to permit rotation of the pedal 118 from a rotational neutral position to be detected. The rotation sensor may be a rotational variable differential transducer (RVDT), an optical sensor or any other type of sensor suitable to detect rotation. The pedal cartridge 120 comprises a first rotation sensor component of the rotation sensor, which in the present embodiment, is a rotor. The pedal axle 204 comprises a second rotation sensor component of the rotation sensor, which in the present embodiment, is a stator, configured complementary to the first rotation sensor component to enable rotation detection of the pedal cartridge 120 around the pedal axle 204. In an alternative embodiment, rotor may be located in the pedal axle 204, forming the first rotation sensor component, and stator may be located in the pedal cartridge 120, forming the second rotation sensor component.

The first rotation sensor component is enclosed within the housing 210, and may be a braking sensor component. During a braking action, the first rotation sensor component interacts with the second rotation sensor component of the pedal mechanism to permit rotation of the pedal 118 about the pedal axle 204 from the rotational neutral position (e.g. during the aircraft movement control process) to be detected, and in response permits a braking signal to be sent to the aircraft. When the pedal 118 is in the rotational neutral position, no braking signal is sent to the aircraft.

When it is desired to apply an aircraft brake, i.e. to reduce a speed of the aircraft, the pilot pushes on the top of the pedal 118, such that the pedal 118 rotates about the pedal axle 204 from the rotational neutral position. The rotation sensor formed by the first and second rotation sensor components permits detection of this rotation and allows a determination to be made of the amount of braking to apply based on the degree of rotation of the pedal 118 relative to the pedal axle 204 from the rotational neutral position. The rotation sensor also permits an appropriate braking signal to be sent to the aircraft.

As illustrated in FIG. 9, the pedal axle 204 comprises a rotational feeling device 704 enclosed within the housing 210. The rotational feeling device 704 biases the pedal 118 to the rotational neutral position during braking. The rotational feeling device 704 provides feedback to the pilot. The rotational feeling device 704 is an elastic element 704, in particular a coiled spring 704 configured to bias the pedal 118 to the rotational neutral position and to provide feedback to the pilot. The coiled spring 704 surrounds the pedal axle 204. The coiled spring 704 is connected at a first end to the pedal axle 204. The coiled spring 704 is connected at a second end (opposite to the first end) to the pedal cartridge 120. Connecting the coiled spring 704 in this way causes the coiled spring 704 to provide the biasing force on relative rotation between the pedal 118 and the pedal axle 204 from the pedal's rotational neutral position.

During the braking action, the pedals 202 do not move along the translational path. Similarly, during the rudder action, the pedals 202 do not rotate about the pedal axle 204. This is because the braking rotational path is connected to the pedal axle 204 while the rudder rotational path is connected to the pedal mechanism 100. The braking rotational path is therefore provided independently from the rudder rotational path. As such, in the case of jamming of the braking rotational path, the rudder rotational path is not affected, and no undesired braking occurs. Additionally, in the case of jamming of the rudder rotational path, the braking rotational path is not affected, and a braking action is still possible.

With reference to FIG. 9, the pedal 118 rotates about the pedal axle 204 through bearings (or bushings) 802 installed in the housing 210. The bearings 802 are comprised in the pedal cartridge 120.

The first rotation sensor component comprises a stator (or rotor) 804 fixed in the pedal axle 204 and a cap 806 fixed to the housing 210. The second rotation sensor component is the other of the stator or the rotor. The pedal mechanism further comprises electric and/or electronic components of the sensor (not shown), which measure the position of the first rotation sensor component relative to the second rotation sensor component to determine the rotational position of the pedal relative to the rotational neutral position and transmit a sensor signal (e.g. a braking signal) to the aircraft.

Rotation of the pedal 118 about the pedal axle 204 causes a reciprocal rotation of the housing 210 and cap 806 relative to the pedal axle 204 allowing the rotation sensor 702 to detect the rotational position of the pedal 118 around the pedal axle 204. To set the sensor, the cap 806 is rotated when the pedal cartridge 120 is in the rotational neutral position, i.e. to set the 0° point of the rotation sensor relative to the pedal axle 204.

The rotational feeling device 704 has its second end in contact with a breakout screw 808. To preload the rotational feeling device 704, the pedal cartridge 120 is rotated about the pedal axis until allowing installation of a preload pin 810 through the housing 210 and in contact with pedal axle 204, in a groove 812 machined in the pedal axle 204. When installed, the preload pin 810 can only move in the limited groove 812. This groove 812 is used to set the 0° point of the pedal 118 (i.e. when the pedal cartridge 120 is in the rotational neutral position) and the maximum rotation of the pedal 118 about the pedal axle 204. Once the rotational feeling device 704 is preloaded, the breakout screw 808 is then used to tune finely the breakout of the feeling device and breakout screw 808 is then locked in position in the housing 210 with its associated nut.

As illustrated in FIG. 9, the pedal 118 is connected to the housing 210 via screws 814. This means that the pedal 118 can be installed on the housing 210 at the end of the assembly process, for example, on a final assembly line ("FAL"), thereby avoiding scratches and foreign object damage ("FOD"). It also allows the pedal 118 to be easily detached and replaced.

As the pedal arm 106 rotates on translation of the pedal 118 (in an aircraft movement control process (rudder action) or in a stature adjustment process as described above), the pedal axle 204 rotates with the pedal. This causes the rotational neutral position of the pedal 118 to change. This is illustrated in FIG. 5*a-c*, which show the pedal 118 in different rotational neutral positions for three different stature position. As can be seen, as the pedal 118 moves closer to the pilot, the distal end (furthest from the pilot at the pilot's toes) of the pedal 118 moves downwards, making the pedal 118 less inclined towards the pilot in the rotational neutral position. This improves the ergonomics for the pilot, particularly where the pedal arm rotation point 106 is above the pedal arm connection point 116 (i.e. further from the aircraft floor in use). Using the fixed pedal axle 204 in this way provides a compact mechanism for improving the ergonomics, and is particularly achievable when the cartridge 120 comprises the rotational feeling device and/or sensing device as described herein.

Figure 11:
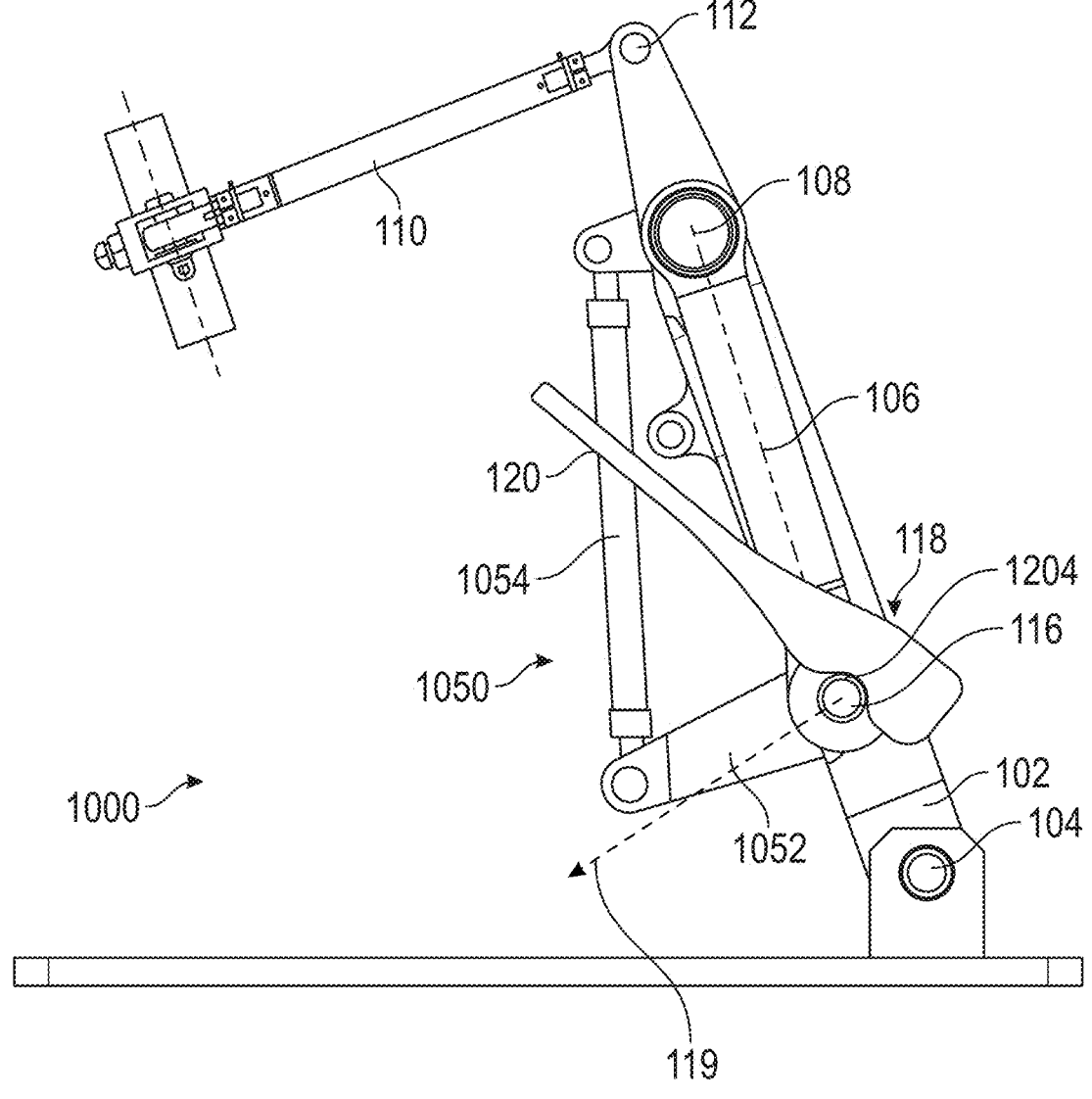
FIG. 11 shows a schematic of a second pedal mechanism.

Referring to FIG. 11, there is shown a second pedal mechanism 1000. The second pedal mechanism 1000 comprises many of the features of the pedal mechanism 100 described above and repeated description of those features is omitted. For example, the second pedal mechanism 1000 may comprise a second pedal cartridge.

As in the pedal mechanism 100, the pedal 120 of the second pedal mechanism 1000 is rotatably connected to the pedal arm 106 at the pedal connection point 116, with the pedal rotatably connected to a pedal axle 1204. However, in the second pedal mechanism 1000, the pedal axle 1204 is not rigidly fixed to the pedal arm 106, and is rotatably connected to the pedal arm 106.

The pedal axle 1204 is connected to a pedal tilt mechanism 1050. The pedal tilt mechanism comprises a pedal tilt crank 1052. A first end of the pedal tilt crank 1052 is rotatably connected to the pedal arm 106 at the pedal connection point 116. The pedal tilt crank 1052 is rigidly fixed to the pedal axle 1204, thereby rotatably connecting the pedal axle 1204 to the pedal arm 106.

The pedal tilt mechanism 1050 comprises a pedal tilt rod 1054. A first end of the pedal tilt rod 1054 is rotatably connected to a second end of the pedal tilt crank 1052. A second end of the pedal tilt rod 1054 is rotatably connected to the stature adjustment arm 102. Each of the pedals 120, 120*a* comprises a pedal tilt mechanism 1050 which operates in the same manner.

During the aircraft control process, on translation of the pedal 120 and rotation of the pedal arm 106, the pedal tilt crank 1052 translates. The pedal tilt rod 1054 rotates about its second end at the fixed stature adjustment arm 102. This causes the rotational neutral position of the pedal to vary on translation of the pedals 120 120*a* during the aircraft control process. The pedal tilt mechanism 1050 therefore causes the pedal tilt at the pedal's rotational neutral position to vary in a similar manner to that shown in FIG. 5. However, the pedal tilt mechanism 1050 may reduce the variation in pedal tilt at the pedal's rotational neutral position in comparison to in the pedal mechanism 100.

The rotational neutral position of the pedal 120 also varies during the stature adjustment process. However, the stature adjustment arm 102 rotates during stature adjustment as described above and the pedal tilt rod 1054 is rotatably connected to the stature adjustment arm 102. This means that the change in rotational neutral position during the stature adjustment process may be reduced relative to that during the aircraft control process for a given pedal translation. This may be ergonomically preferable.

In other examples (not shown), the pedal arm rotation point 108 may be mounted on a slider rather than to the stature adjustment arm 102, with the slider constrained to move along the circular path described above (e.g. by a rail). Alternatively, path shapes other than a circular path may be used. In these examples, during the stature adjustment process, the actuator applies a force to the pedal arm rotation point, which causes the slider to translate along the rail, causing movement of the pedal and the translational neutral position of the pedal arm connection point. Other examples may employ alternative mechanisms to constrain the motion of the pedal arm rotation point during the stature adjustment process.

Various aspects of the pedal mechanism disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from the invention in its broader aspects. The scope of the following claims should not be limited by the embodiments set forth in the examples, but should be given the broadest reasonable interpretation consistent with the description as a whole.

The invention claimed is:

1. A pedal cartridge for an aircraft, the pedal cartridge comprising:
   a pedal and a housing configured to enclose a pedal axle of a pedal mechanism such that the pedal is rotatably connectable to the pedal axle;
   a rotation sensor located partly in the housing and partly locatable in the pedal axle, and configured to permit rotation of the pedal about the pedal axle to be detected;
   a rotational feeling device configured to bias the pedal to a rotational neutral position;
   wherein the rotational feeling device is located in the housing;
   wherein the rotational feeling device comprises an elastic element, wherein a first end of the elastic element is connectable to the pedal axle and a second end of the elastic element is connected to the pedal, the elastic element configured to surround the pedal axle.

2. A pedal cartridge as claimed in claim 1, wherein the rotation sensor is a braking sensor configured to permit a braking signal to be sent to the aircraft upon detection of the rotation.

3. A pedal cartridge as claimed in claim 1, wherein the housing and the pedal are configured to together maintain the pedal cartridge on the pedal axle.

4. A pedal mechanism for an aircraft, the pedal mechanism comprising:
   the pedal axle;
   a pedal cartridge as claimed in claim 1, the pedal axle enclosed in the housing.

5. A pedal mechanism according to claim 4, wherein the pedal mechanism comprises a pedal arm connected to the pedal axle, the pedal arm rotatable about a pedal arm rotation point, wherein the pedal axle is fixed to the pedal arm such that rotation of the pedal arm causes rotation of the pedal axle to vary a rotational neutral position.

6. A pedal mechanism according to claim 5, wherein the pedal is positioned vertically below the pedal arm rotation point in use.

7. A pedal mechanism according to claim 5, wherein the pedal arm is rotatable about the pedal arm rotation point on translation of the pedal, the pedal mechanism further comprising a stature adjustment mechanism, the stature adjustment mechanism actuatable, during a stature adjustment process, to move the pedal arm rotation point.

8. A rudder and brake pedal unit comprising:
   a pedal mechanism according to claim 5;
   wherein the pedal mechanism according to claim 5 is a first pedal mechanism; and
   a second pedal mechanism;
   wherein the first and second pedal mechanisms are coupled to each other.

9. A pedal cartridge for an aircraft, the pedal cartridge comprising:
   a pedal and a housing configured to receive a pedal axle of a pedal mechanism such that the pedal is rotatably connectable to the pedal axle; and
   a rotation sensor located partly in the housing and partly locatable in the pedal axle, and configured to permit rotation of the pedal about the pedal axle to be detected;
   wherein the rotation sensor comprises a cap rotationally coupled to the pedal cartridge, wherein the cap rotates on rotation of the pedal on the pedal axle.

10. A pedal cartridge as claimed in claim 9, and comprising a rotational feeling device configured to bias the pedal to a rotational neutral position.

11. A pedal cartridge as claimed in claim 10, wherein the rotational feeling device is located in the housing.

12. A pedal cartridge as claimed in claim 11, wherein the rotational feeling device comprises an elastic element, wherein a first end of the elastic element is connectable to the pedal axle and a second end of the elastic element is connected to the pedal, the elastic element configured to surround the pedal axle.

* * * * *